A. CHEVROLET.
PISTON RING.
APPLICATION FILED MAR. 21, 1913.

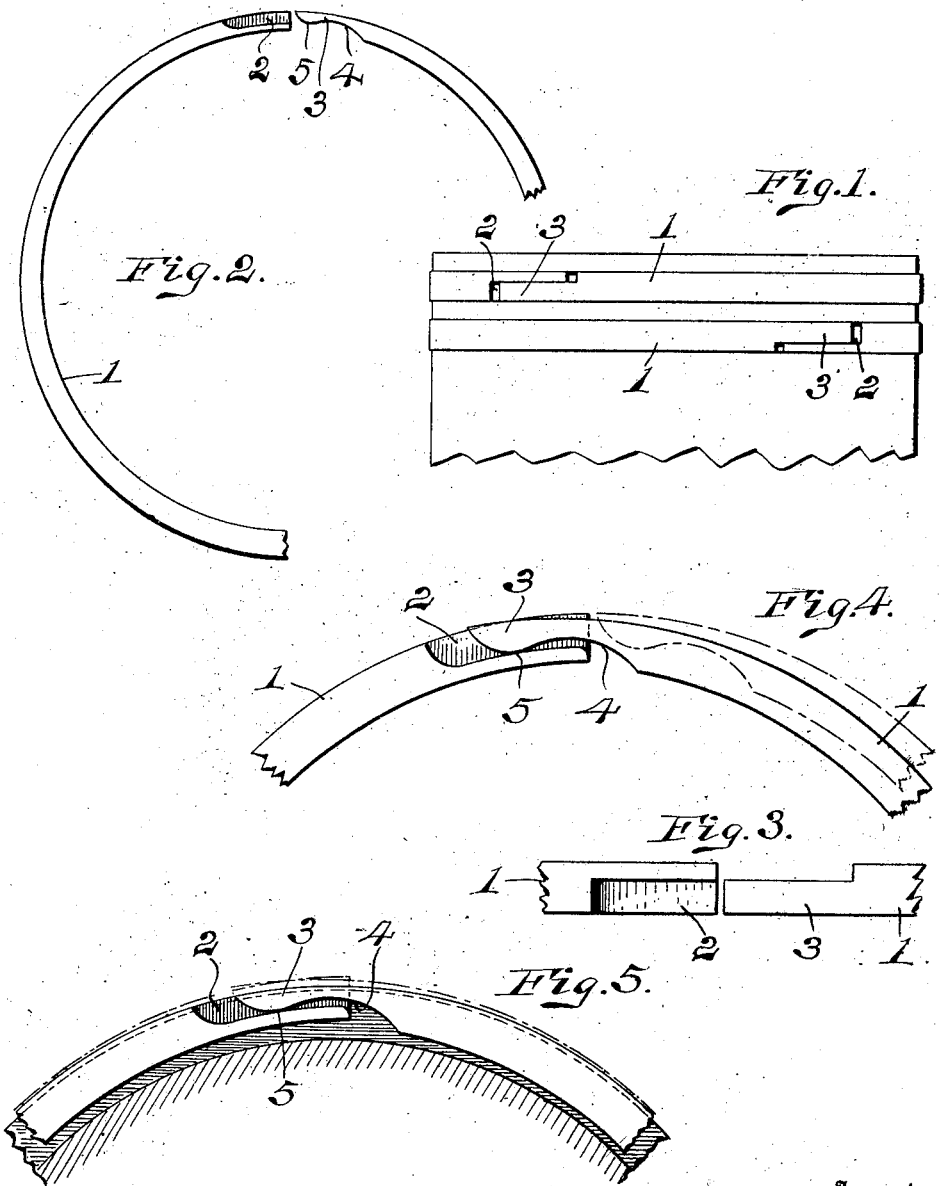

1,094,057.

Patented Apr. 21, 1914.

2 SHEETS—SHEET 2.

Witnesses
Anna M. Dorr.
L. E. Flanders.

Inventor
Arthur Chevrolet
By
Attorneys

UNITED STATES PATENT OFFICE.

ARTHUR CHEVROLET, OF JACKSON, MICHIGAN.

PISTON-RING.

1,094,057. Specification of Letters Patent. Patented Apr. 21, 1914.

Application filed March 21, 1913. Serial No. 755,926.

*To all whom it may concern:*

Be it known that I, ARTHUR CHEVROLET, a citizen of the Swiss Confederacy, residing at Jackson, in the county of Jackson and State of Michigan, have invented certain new and useful Improvements in Piston-Rings, of which the following is a specification, reference being had therein to the accompanying drawings.

This invention relates to improvements in metal packing rings for the pistons of engines, pumps, and similar machines, and more particularly to packing rings for pistons of internal combustion engines, the object of the invention being to provide a construction which is such that the ring will remain tight at all times, automatically adjusting itself to conditions and providing for wear of the parts in use.

The invention consists in the matters hereinafter set forth, and more particularly pointed out in the claims, reference being had to the accompanying drawings in which—

Figure 6:
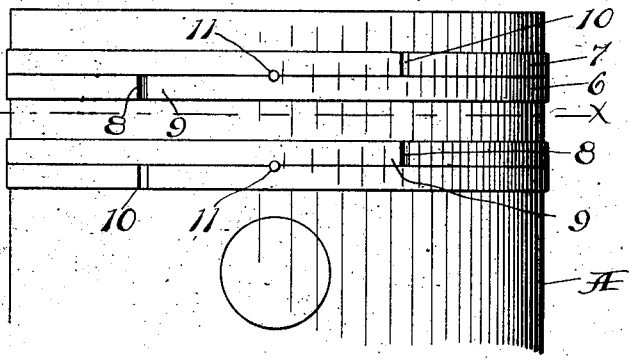
Figure 7:
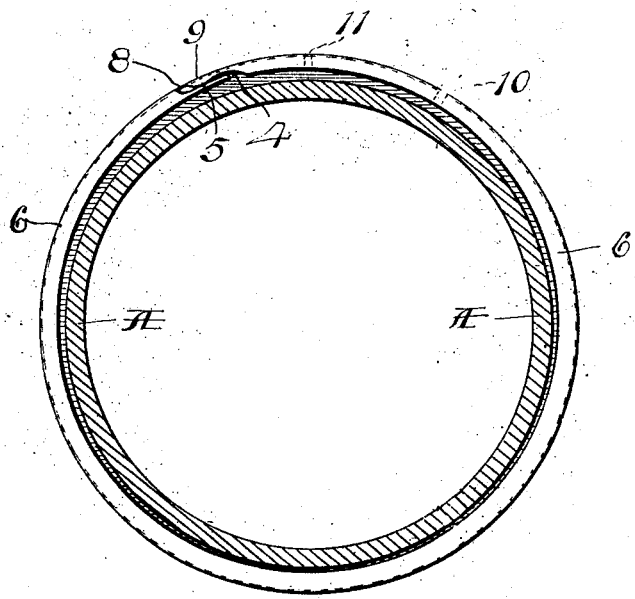
Figure 8:
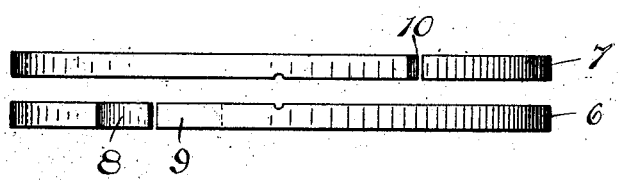

Figure 1 is a side elevation of a portion of a piston to which rings embodying the invention are applied; Fig. 2 is a side elevation of a portion of one of the rings detached; Fig. 3 is a plan view of a portion of one of the rings showing the lap joint; Fig. 4 is a side elevation of the same illustrating the position which the ring will take when the ring is compressed to overlap the ends; Fig. 5 is a view similar to Fig. 4 showing the ring in place on a portion of the piston and illustrating the manner in which the ring is turned down to fit within the groove of the piston. Fig. 6 is a side elevation of a portion of a piston showing rings applied thereto of a modified construction. Fig. 7 is a transverse section of Fig. 6 on the line x—x, and Fig. 8 is an edge view of a pair of rings detached and in open position.

There is always more or less leakage past packing rings of the usual construction having overlapping or abutting ends due to the fact that as the rings wear away on their outer face in use, the ends separate and thus permit the fluid under compression to leak through. The object of this invention is to so construct the overlapping ends of the ring that as the ring wears away in use and it opens out, the ends will still be held firmly in contact with each other and thus prevent leakage. These rings are formed by cutting portions of the desired length to form the ring 1 from a formed tubular body, in the usual manner, and the ring is then severed. A groove 2 is cut in the outer face of the ring extending circumferentially from one of the severed ends and cutting through one side edge of the ring. The opposite end of the ring is formed with a tongue 3 of a width exactly the same as the width of the groove, the side of the ring adjacent to the tongue being cut away so that the tongue will fit within the groove when the ring is compressed as is shown in Fig. 4, bringing the ends into overlapping relation. The side of the tongue which is adapted to contact the bottom of the groove, is cut away at 4 near the base of the tongue, thus leaving a rounded projecting portion 5 adjacent to the outer end of the tongue adapted to rest upon the bottom of the groove.

When the ends of the ring have been formed with the groove and tongue, as described, the ring is then compressed to bring the tongue into the groove as shown in Fig. 4. This distorts the ring and its overlapping ends project slightly beyond the outer face of the ring. Therefore, in order to make the ring fit perfectly within the cylinder in which it is adapted to operate, it is necessary to true up the outer face of the ring while it is held with its ends in overlapping relation. In Fig. 5 the ring is shown in full size as having been faced off in this manner to a true circle, the dotted lines indicating the part which has been cut away.

When the groove 2 is formed, its bottom is cut concentric with the outer face of the ring but after the ends have been overlapped and the ring turned down to a true circle on its outer face, the cutting away of the outer face of the end in which the groove is formed, makes this groove deeper at its inner end than it is at the end of the ring owing to the fact that the ring when compressed before being turned to its true circle on its outer face, assumes a slightly oval shape and therefore when the ring is turned to a true circle while being so held, the greatest amount of metal is cut away from that portion which projects beyond the true circle or at the overlapping end.

When the ring has been formed up as described, and placed within the groove of a piston, its outer face will fit accurately the bore of the cylinder and as said face wears away in use, the overlapping ends will move upon each other owing to the tendency of the ring to open out, and its outer face will thus be held closely against the surface of the cylinder, making a tight joint. As the ring thus opens out the tongue 3 slides along the groove 2 and as the bottom of the groove is eccentric to the outer face of the ring, or, in other words, the groove is deeper at its inner end than it is at the extreme end of the ring, the tongue 3 will be constantly held in contact with the bore of the cylinder as the projection 5 moves up the inclined bottom of the groove. The end of the ring having the groove is more rigid than the tongue and it will therefore exert a strong constant pressure outwardly upon the tongue to hold said tongue in firm contact with the bore of the cylinder. By cutting away the tongue at its inner side, it may project into the groove and its contacting portion 5 may engage the bottom of the groove at a considerable distance from the end of the ring without the base of the tongue coming in contact with the bottom of the groove, and thus the tongue will always contact the bottom of the groove at one point and give a tight joint.

The rings are preferably placed in pairs upon the piston $a$ with the rings of each pair oppositely arranged, that is with the tongue 3 of each ring arranged at the side thereof adjacent to the other ring of the pair. The continuous side of one of the rings which is formed by the tongue on one end overlapping the reduced opposite end of the ring, is therefore held in close contact with the side of the groove in which it is placed to prevent leakage, during the movement of the piston in one direction and said side surface of the other ring will likewise be held in contact with the side of the groove during the movement of the piston in the opposite direction.

In Figs. 6 to 8 inclusive a modified construction is shown in which each ring is made up of a pair of rings, one ring 6 of each pair being formed with overlapping ends and the other ring 7 being formed with abutting ends. The ring 6 is cut away at one end as at 8 to form a seat similar to the groove 2 of the construction shown in Fig. 5, for the tongue 9 which is formed on the opposite end of the ring, said tongue being similar to the tongue 3 and provided with the projecting contact portion 5 to engage the seat on the opposite end of the ring and cut away at the base of the tongue as at 4 so that said tongue will not contact the opposite end of the ring. The ring 6 lies in contact with the side of the ring 7 and in such relation thereto as to break joints therewith, that is, the overlapping ends of the ring 6 are positioned at a considerable distance from the abutting ends 10 of the ring 7. The rings are held in their relative position by means of a pin or wedge 11 fitting within notches in the adjacent sides of the two rings and thus preventing the rings from turning relatively upon the piston.

Obviously, changes may be made in the construction and arrangement of parts without departing from the spirit of my invention and I do not therefore limit myself to the particular form or construction shown.

What I claim as my invention is:—

1. A packing ring for pistons comprising a split ring one end of which is cut away at the outer side to form a seating surface eccentric to the outer surface of the ring, and a projecting end portion on the opposite end of the ring having an enlargement to engage said seating surface.

2. A packing ring for pistons comprising a split ring formed at one end with a seating surface, and provided at its opposite end with a tongue to overlap said seating surface, said tongue being formed with an enlargement near its free end to engage said seating surface.

3. A packing ring for pistons comprising a split ring formed with an end portion having an outer surface formed eccentric to the outer surface of the ring, and a tongue on the opposite end of said ring having an inwardly projecting portion adjacent to the free end of the tongue to engage said surface of said end portion of the ring.

4. A packing ring for pistons comprising a split ring having an end portion of lesser thickness than the thickness of the ring and formed with an outer surface inclined inwardly of the ring from the free end of said end portion, and a tongue on the opposite end of said ring cut away at the inner side thereof adjacent to the base of the tongue and forming an enlargement adjacent to the free end of the tongue to engage said inclined surface of said end portion.

5. A packing ring for pistons comprising a pair of split rings arranged side by side with their edges in contact and each provided with a notch in its side adjacent to the other ring, a pin in said notches to prevent relative turning of said rings, one ring of each pair being formed with an end portion which is of lesser thickness than the body of the ring and is formed with an outer surface eccentric to the outer surface of the ring, and a tongue on the opposite end of said ring to overlap said reduced end and having an inwardly projecting portion to engage the said outer surface of said reduced end.

6. A packing ring comprising a split ring having ends so shaped as to present projecting portions on the periphery of said ring requiring trimming before the periphery of said ring is constructed.

7. A packing ring comprising a resilient split ring having its ends placed together in a manner as to compress and distort said ring whereby the ends of said ring will project from the periphery thereof and require trimming before the periphery of said ring is constructed.

8. A packing ring comprising a resilient split ring having its ends placed together in a manner as to compress and distort said ring, and means in connection with the ends of said ring for expanding said ring as the periphery thereof is worn.

In testimony whereof I affix my signature in presence of two witnesses.

ARTHUR CHEVROLET.

Witnesses:
ERNEST E. PIERCE,
JOHN B. FOOTE.